(12) United States Patent
Bohlander et al.

(10) Patent No.: US 9,193,598 B2
(45) Date of Patent: Nov. 24, 2015

(54) STORAGE-STABLE SILICATE SOLUTIONS

(75) Inventors: Ralf Bohlander, Erkrath (DE); Silke Muckenfuβ, Langenfeld (DE); Rüdiger Ziervogel, Monheim (DE)

(73) Assignee: Cognis IP Management GmbH, Duesseldorf (DE)

( * ) Notice: Subject to any disclaimer, the term of this patent is extended or adjusted under 35 U.S.C. 154(b) by 812 days.

(21) Appl. No.: 13/022,092

(22) Filed: Feb. 7, 2011

(65) Prior Publication Data

US 2011/0192321 A1 Aug. 11, 2011

(30) Foreign Application Priority Data

Feb. 6, 2010 (EP) ..................... 10001239

(51) Int. Cl.
*C09D 1/00* (2006.01)
*C01B 33/32* (2006.01)

(52) U.S. Cl.
CPC ..................... *C01B 33/325* (2013.01)

(58) Field of Classification Search
CPC .................................... C01B 33/325
See application file for complete search history.

(56) References Cited

U.S. PATENT DOCUMENTS

| | | | | |
|---|---|---|---|---|
| 4,447,561 A | | 5/1984 | Horn et al. | |
| 5,061,450 A | * | 10/1991 | Aoyagi | 422/533 |
| 5,128,029 A | * | 7/1992 | Herrmann | 210/107 |
| 2006/0283095 A1 | | 12/2006 | Mahulikar et al. | |

FOREIGN PATENT DOCUMENTS

| | | | |
|---|---|---|---|
| BE | 649739 | * | 6/1964 |
| BE | 649739 | | 12/1964 |
| DE | 216914 A1 | | 1/1985 |
| DE | 3938789 A1 | | 5/1991 |
| GB | 2099412 A | | 12/1982 |
| JP | 158135123 | * | 8/1983 |
| WO | 99/52821 A2 | | 10/1999 |

OTHER PUBLICATIONS

"Storing PQ Liquid Silicates, Small Storage Tank Recommendations" The PQ Corporation; Industrial Chemicals Division http://www.pqcorp.com/technicalservice/..%5Cliterature%5CREP20.pdf accessed on Jan. 19, 2011.
"Bulk Storage of Sodium Silicate Solutions" Sodium Silicates; General Chemicals Division; J. Crosfield & Sons, Limited ed. 1976 pp. 1-23.
Sodium Silicate Handbook; Diamond Shamrock 1982, p. 30.
European Search Report from EP Application No. 10012392 dated Aug. 25, 2010.

* cited by examiner

*Primary Examiner* — Bijay Saha
(74) *Attorney, Agent, or Firm* — Servilla Whitney LLC

(57) ABSTRACT

Disclosed are aqueous solutions of silicates (waterglasses), comprising (a) 20 to 40% by weight of $SiO_2$, (b) 10 to 30% by weight of $M_2O$, where M is a cation selected from the group consisting of $Li^+$, $Na^+$, $K^+$, and $NY_4^+$, where Y is a C1-C6 alkyl or alkenyl radical, and (c) water; which solutions are obtained by a process comprising (i) providing an aqueous solution of a silicate (waterglass) of the formula $M_2O \times nSiO_2$, as above, where n=1-5, and (ii) fine filtering the solution over a filter element that is stable at pH values of 12 or more, at a temperature in the range of 20 to 140° C., provided that the filtrate solution has a turbidity of 4 FNU or less. The aqueous solutions are clear at temperatures below −10° C., and are storage-stable against turbidity for at least 1 month.

10 Claims, No Drawings

STORAGE-STABLE SILICATE SOLUTIONS

CROSS REFERENCE

This application claims the benefit of priority under 35 USC §119 of European Patent Application number 10001239.2, filed on Feb. 6, 2010, which is incorporated by reference herein in its entirety.

FIELD OF THE INVENTION

The invention relates to very clear filtered alkali metal silicate solutions (waterglass) solutions, the freezing point of which is greatly reduced, and which are storage-stable against turbidity at temperatures below −10° C. for at least one month.

BACKGROUND OF THE INVENTION

As is known, waterglass is understood by a person skilled in the art as meaning glassy, water-soluble alkali metal silicates (i.e. alkali metal salts of silicic acids) solidified from the melt flow, or viscous aqueous solutions thereof. In the waterglass, there are typically 1 to 5 mol of $SiO_2$ per 1 mol of alkali metal oxide ($Alk_2O$—where Alk is the alkali metals lithium, sodium and potassium), and the soda waterglass and potash waterglass are therefore usually also characterized by the quotient of % $SiO_2$ to % alkali metal oxide. In chemical terms, water glasses are therefore alkali metal silicates with a molar ratio (MR) of $SiO_2$ to $Alk_2O$ in the range from 0.5 to 8, this molar ratio being understood as meaning the molar ratio of the $SiO_2$ and $Alk_2O$ building blocks constituting the alkali metal silicate. They contain oligomeric silicate anions with alkali metal cations as counterions.

In the pure state, waterglasses are colorless glasses which form colloidal clear alkaline-reacting solutions with water at elevated temperature and pressure. Waterglass is usually produced by melting quartz sand together with soda or potash at 1400 to 1500° C., where the silicic acid drives out the $CO_2$. The solidified melt is either traded in the ground state or converted to an aqueous solution with the desired concentration. Aqueous solutions have the advantage of better applicability in a number of different fields of application.

As is known to the person skilled in the art, when producing waterglass in the melting furnace, firstly a melt of alkali metal silicate is formed, which solidifies upon cooling to room temperature to give glass lumps (so-called lump glass). In industry, these glass lumps are dissolved in water in pressurized autoclaves, usually at elevated temperature, for example at ca. 140° C. (so-called dissolution process).

Alternatively, sand can also be dissolved directly by hydrothermal means in concentrated alkali metal hydroxide solution, although only solutions with a relatively low MR can be obtained.

Technical waterglass solutions usually comprise a solids fraction of ca. 30 to 60% by weight.

Waterglass solutions customary in the marketplace contain, irrespective of the method of manufacture, as a consequence of the raw material, small amounts of water-insoluble impurities, these in the case of aqueous solutions customary in the marketplace being in total below 0.1% by weight to 0.01% by weight. These impurities lead to a certain turbidity which is scarcely visible to the eye; according to investigations by the applicant, the specified waterglass solutions customary in the marketplace, when transparency is measured in accordance with DIN EN ISO 7027, have values in the range from 5 to 40 FNU.

All leading manufacturers give warnings in their information with regard to storage and transportation against the risk of frost when dealing with waterglass solutions. In the event of freezing, product separation may in certain circumstances also additionally arise, after which the products cannot be regenerated so as to be usable. In general, it is therefore advised to transport and store the solutions above 5° C. As far as possible, tanks should be positioned in heated works premises or they must, if set up outside, be insulated and equipped with trace heating (PQ internet info "Storing Liquid Silicates, Storage Tank Recommendations"; Crosfield Chemicals "Sodium Silicates" ed. 1976 1-23 Bulk Storage; Diamond Shamrock "Sodium Silicate Handbook" 1982 p. 30). Accordingly, the safety data sheets of all leading waterglass manufacturers warn against the effect of frost; the latter also independently of whether it is a technical product, or whether a very clear filtered solution is delivered for specific applications. (Example from the world's largest manufacturer PQ (Philadelphia Quartz Co.): in the safety data sheets for the products "Sodium Silicate N" (technical-grade) and "N CLEAR" (specifically filtered grade)—molar ratio (MR) of $SiO_2$ to $Alk_2O$ for both products 3.3—or "Sodium Silicate V gg STAR" (specifically "brilliant clear" grade)—MR 2.5-0° C. is stated as the lowest storage temperature.)

DETAILED DESCRIPTION OF PREFERRED EMBODIMENTS

It was an object of the present invention to provide clear aqueous solutions of silicates (waterglass solutions) with improved storage stability. The silicate solutions here should in particular be storage-stable at temperatures below the freezing point of water, i.e. below −10° C.

Within the context of the present invention, storage stability is understood here as meaning that the silicate solutions remain clear and liquid during storage below −10° C. over at least 1 month (30 days), such that neither turbidity nor phase separations of any kind arise, nor that the solutions completely or partially solidify or freeze.

The applicant has now succeeded in achieving the specified objective even though the prior art advises against storage of silicate solutions under frost conditions, specifically because conventional silicate solutions completely or partially solidify or at least form turbidity under these conditions. Consequently, an existing misconception is overcome by the present invention.

The invention firstly provides a process for preparing clear aqueous solutions of silicates (waterglasses) that are storage-stable against turbidity even at temperatures below −10° C. for at least 1 month, comprising 20 to 40% by weight of $SiO_2$, 10 to 30% by weight of $M_2O$, where M is a cation from the group $Li^+$, $Na^+$, $K^+$, $NY_4^+$ and Y is an alkyl or alkenyl radical having 1 to 6 carbon atoms, water, where an aqueous solution of a silicate (waterglass) of the general formula $M_2O \times nSiO_2$, in which M is a cation from the group $Li^+$, $Na^+$, $K^+$, $NY_4^+$ and where Y is an alkyl or alkenyl radical having 1 to 6 carbon atoms and n is a number in the range from 1 to 5, is introduced as initial charge and a fine filtration is carried out over a filter element stable at pH values of 12 or more in a temperature range from 20 to 140° C., with the proviso that the filtrate solution has a turbidity of 4 FNU or less.

The so-called nephelometric turbidity unit (NTU) is a unit for turbidity measurements in liquids used in water treatment. It is the unit of the turbidity of a liquid measured using a calibrated nephelometer (turbidity photometer). The unit NTU is more customary in the USA. The limiting value for the turbidity of drinking water there and in the Federal Republic of Germany is 1 NTU. In Germany, the unit TU/F (turbidity unit/formazine) is customary (in the 2001 Drinking Water Directive, the unit NTU is used). The international turbidity standard is the chemical formazine which forms particles of different size in water. A unit derived from NTU in water treatment is FNU (formazine nephelometric unit), which is described in detail in DIN ES ISO 7027.

The term "FNU" (formazine nephelometric units) is known to the person skilled in the art. Within the context of the present invention, the turbidity measurements required for ascertaining the FNU values of the silicate solutions according to the invention should be carried out in accordance with DIN EN ISO 7027. The turbidity measurements are carried out here at 20° C., the aqueous silicate solutions being analyzed as such, i.e. in the concentration in which they are present after carrying out the filtration step according to the invention—the concentration range within which the FNU values are measured is the concentration range of technical waterglass solutions which usually have a solids fraction in the range from 30 to 60% by weight, the preferred range being 35 to 55% by weight. Standardization of the measurement to a certain concentration is not carried out since the silicate solutions become more turbid upon dilution with water.

The filter elements to be used in the fine filtration—hereinbelow also abbreviated to filtration—are to be selected such that the filtrate solution has a turbidity of 4 FNU or less in accordance with DIN EN ISO 7027.

The filter elements must be alkali-resistant such that they are stable at pH values of 12 or more, i.e. can be operated under the resultant highly alkaline conditions without decomposition. Examples of suitable filter elements are filter plates made of fibers of the organic polymers ABS (acrylonitrile/butadiene/styrene copolymer), ECTFE (ethylene/chlorotrifluoroethylene copolymer), PE (polyethylene), PES (polyethersulfone), PP (polypropylene), PFA (perfluoroalkoxy copolymer), PS (polystyrene) and PVDF (polyvinylidene fluoride), wood pulp, or made of stainless steel.

The filter elements preferably have a pore size in the range from 0.25 to 25μ and in particular from 1 to 10μ (1μ=1 micrometer).

Preferably, the proviso that the filtrate solution has a turbidity of 2 FNU or less and in particular of 1 FNU or less is applicable.

Preferably, the filtration is carried out under pressure. Here, preference is given to a pressure range of above 1 bar to 10 bar and in particular 2 to 8 bar.

It is particularly preferred to carry out the filtration in a temperature range from 50 to 110° C. In the temperature range from 70 to 90° C., which is particularly preferred, a particularly good filtration rate is achieved through temperature-induced lowering of the viscosity of the solution to be filtered without having to accept excessive evaporation of water from the filtrate; within this temperature range, a value of about 80° C. is very particularly preferred.

The solids content of the aqueous silicate solutions according to the invention to be used for the filtration is preferably 25-65% by weight and in particular 40-60% by weight. Technical-grade silicate solutions are preferred here.

In one embodiment, the $SiO_2/M_2O$ molar ratio is in the range from 0.5 to 8, preferably 1 to 4 and in particular 1.6 to 2.7.

The very clear silicate solutions obtainable by the process according to the invention can be used in highly diverse fields of application. Examples of these are: cleaners, fire protection coatings, coating materials for pigments, inorganic adhesives or raw material solution for producing other (insoluble) silicates.

Conventional silicate solutions, in particular technical-grade silicate solutions, which are of course complex compositions, are altered in their composition by the process according to the invention described above. Though these changes may at first glance only appear slight, they are actually nevertheless different compositions, which is evident indirectly from a sharply improved technical effect, namely the storage stability at temperatures below −10° C.

Accordingly, the invention further provides clear aqueous solutions or silicates (waterglasses) storage-stable against turbidity even at temperatures below −10° C. for at least 1 month, comprising 20 to 40% by weight of $SiO_2$,
10 to 30% by weight of $M_2O$, where M is a cation from the group $Li^+$, $Na^+$, $K^+$, $NY_4^+$ and Y is an alkyl or alkenyl radical having 1 to 6 carbon atoms,
water, where these solutions are obtainable by
initially introducing an aqueous solution of a silicate (waterglass) of the general formula $M_2O \times nSiO_2$, in which M is a cation from the group $Li^+$, $Na^+$, $K^+$, $NY_4^+$ and where Y is an alkyl or alkenyl radical having 1 to 6 carbon atoms and n is a number in the range from 1 to 5, and
carrying out a fine filtration through a filter element that is stable at pH values of 12 or more in a temperature range from 20 to 140° C., with the proviso that the filtrate solution has a turbidity of 4 FNU or less.

EXAMPLES

Abbreviations dem. water=demineralized water
PTFE=polytetrafluoroethylene
PP=polypropylene
SC=solids content (in % by weight) of the alkali metal waterglasses
MR=molar ratio of $SiO_2$ to alkali metal oxide of the sodium or potassium waterglasses used
T=filtration temperature (in ° C.)
FA=filter auxiliary
FP-P=pore width of the filter plate (in μ)
FP-M=material of the filter plate
TR-before=turbidity in FNU (in accordance with DIN EN ISO 7027) before the filtration
TR-after=turbidity in FNU (in accordance with DIN EN ISO 7027) after the filtration
FT-before=freezing temperature (in ° C.) before the filtration
FT-after=freezing temperature (in ° C.) after the filtration Examples Technical-grade waterglass solutions were introduced as initial charge in a 500 ml Erlenmeyer flask and brought to an elevated temperature. The solutions were filtered through a Sartorious 100 ml stainless steel pressure filter using various filter plates (FP) or filter auxiliaries (FA). The turbidity/brilliance of the solutions was determined before and after filtration using a HACH Lange turbidity photometer 2100 in scattered light. The raw material solution and the filtrate produced were cooled in a monthly rhythm in steps of 5° C. until solidification of the solution.

The data for the experimental series carried out are listed in tables 1 and 2 below. Experiments C1 to C6 are comparative experiments. The experiments B1 to B6 are experiments according to the invention.

TABLE 1

|  | C1 | C2 | C3 | B1 | B2 | B3 |
|---|---|---|---|---|---|---|
| Waterglass | Sodium | Sodium | Sodium | Sodium | Sodium | Sodium |
| MR | 3 | 2 | 1.7 | 2 | 2 | 2 |
| SC | 40 | 45 | 45 | 45 | 45 | 45 |
| T | 80 | 70 | 60 | 70 | 70 | 70 |
| FA | Perlite | Sand | Sand | None | None | None |
| FP-P | 100 | 100 | 100 | 5 | 2 | 1 |
| FP-M | Steel | Steel | Wood pulp | Wood pulp | Poly-sulfone | PTFE |
| TR-before | 40 | 60 | 60 | 60 | 60 | 60 |
| TR-after | 20 | 30 | 40 | 4 | 1 | 0.5 |
| FT-before | 0 | −2 | −4 | −2 | −2 | −2 |
| FT-after | −1 | −3 | −5 | −12 | −14 | −16 |

TABLE 2

|  | C4 | C5 | C6 | B4 | B5 | B6 |
|---|---|---|---|---|---|---|
| Waterglass | Potas-sium | Potas-sium | Potas-sium | Potas-sium | Potas-sium | Potas-sium |
| MR | 3 | 2.4 | 2.4 | 2.4 | 2.4 | 1.6 |
| SC | 40 | 45 | 45 | 45 | 45 | 50 |
| T | 80 | 90 | 90 | 90 | 70 | 80 |
| FA | Perlite | Sand | Cellulose | None | None | None |
| FP-P | 100 | 100 | 100 | 5 | 2 | 1 |
| FP-M | Steel | Steel | Steel | Poly-sulfone | PP | Polyether-sulfone |
| TR-before | 50 | 60 | 60 | 60 | 60 | 50 |
| TR-after | 15 | 30 | 14 | 0.8 | 0.8 | 0.7 |
| FT-before | 0 | −3 | −3 | −3 | −3 | −3 |
| FT-after | −5 | −4 | −5 | −22 | −24 | −29 |

What is claimed is:

1. A process for preparing a low-temperature storage-stable clear aqueous solution of a silicate (waterglass) which comprises:
   (a) 20 to 40% by weight of $SiO_2$,
   (b) 10 to 30% by weight of $M_2O$, where M comprises a cation selected from the group consisting of $Li^+$, $Na^+$, $K^+$, and $NY_4^+$, where Y is an alkyl or alkenyl group having 1 to 6 carbon atoms, and
   (c) water,
   said process comprising the steps of:
   (i) providing an aqueous solution of a silicate (waterglass) of the formula $M_2O\times nSiO_2$, in which M comprises a cation selected from the group consisting of $Li^+$, $Na^+$, $K^+$, and $NY_4^+$, where Y is an alkyl or alkenyl group having 1 to 6 carbon atoms, and n is a number in the range from 1 to 5, and (ii) fine filtering said aqueous solution over a filter element which is stable at pH values of 12 or more, at a temperature in the range of 20 to 140° C., with the proviso that the filtrate solution has a turbidity of 4 FNU or less, where the FNU values are measured in accordance with DIN EN ISO 7027, said filter element having a pore size that has a range of about 0.25 to 25 μm, said fine filtering carried out at a temperature in the range of about 70 to 90° C.
   wherein said clear aqueous silicate solution is storage-stable against turbidity at temperatures below −10° C. for at least 1 month.

2. The process of claim 1, wherein M comprises a cation selected from the group consisting of $Li^+$, $Na^+$, and $K^+$.

3. The process of claim 1, wherein M comprises the cation $Na^+$, and n is a number in the range 1.6 to 2.8.

4. A clear aqueous solution of a silicate (waterglass), comprising
   (a) 20 to 40% by weight of $SiO_2$,
   (b) 10 to 30% by weight of $M_2O$, where M comprises a cation selected from the group consisting of $Li^+$, $Na^+$, K+, and $NY_4^+$, where Y is an alkyl or alkenyl group having 1 to 6 carbon atoms, and
   (c) water, where said clear aqueous solution is obtained by a process comprising the steps of:
   (i) providing an aqueous solution of a silicate (waterglass) of the formula $M_2O\times nSiO_2$, in which M comprises a cation selected from the group consisting of $Li^+$, $Na^+$, $K^+$, and $NY_4^+$, where Y is an alkyl or alkenyl group having 1 to 6 carbon atoms, and n is a number in the range from 1 to 5, and (ii) fine filtering said aqueous solution through a filter element that is stable at pH values of 12 or more, at a temperature in the range of 20 to 140° C., with the proviso that the filtrate solution has a turbidity of 4 FNU or less, where the FNU values are measured in accordance with DIN EN ISO 7027, said filter element having a pore size that has a range of about 0.25 to 25 μm, said fine filtering carried out at a temperature in the range of about 70 to 90° C.
   wherein said clear aqueous silicate solution is storage-stable against turbidity at temperatures below −10° C. for at least 1 month.

5. The process of claim 1 wherein the filter element has a pore size in the range of about 1 to 10μ.

6. The process of claim 1 wherein M comprises the cation $NY_4^+$, where Y is an alkyl or alkenyl group having 1 to 6 carbon atoms.

7. The process of claim 1 wherein the filter element comprises a material selected from one or more of wood pulp, acrylonitrile/butadiene/styrene copolymer, ethylene/chlorotrifluoroethylene copolymer, polyethylene, polyethersulfone, polypropylene, perfluoroalkoxy copolymer, polystyrene and polyvinylidene fluoride.

8. The clear aqueous solution of silicate (waterglass) of claim 4 wherein the filter element has a pore size in the range of about 1 to 10μ.

9. The clear aqueous solution of silicate (waterglass) of claim 4 wherein M comprises the cation $NY_4^+$, where Y is an alkyl or alkenyl group having 1 to 6 carbon atoms.

10. The process of claim 4 wherein the filter element comprises a material selected from one or more of wood pulp, acrylonitrile/butadiene/styrene copolymer, ethylene/chlorotrifluoroethylene copolymer, polyethylene, polyethersulfone, polypropylene, perfluoroalkoxy copolymer, polystyrene and polyvinylidene fluoride.

* * * * *